Oct. 29, 1940.  E. O. SCHWEITZER, JR  2,219,457
MOTOR CONSTRUCTION
Filed Dec. 17, 1938   3 Sheets-Sheet 1
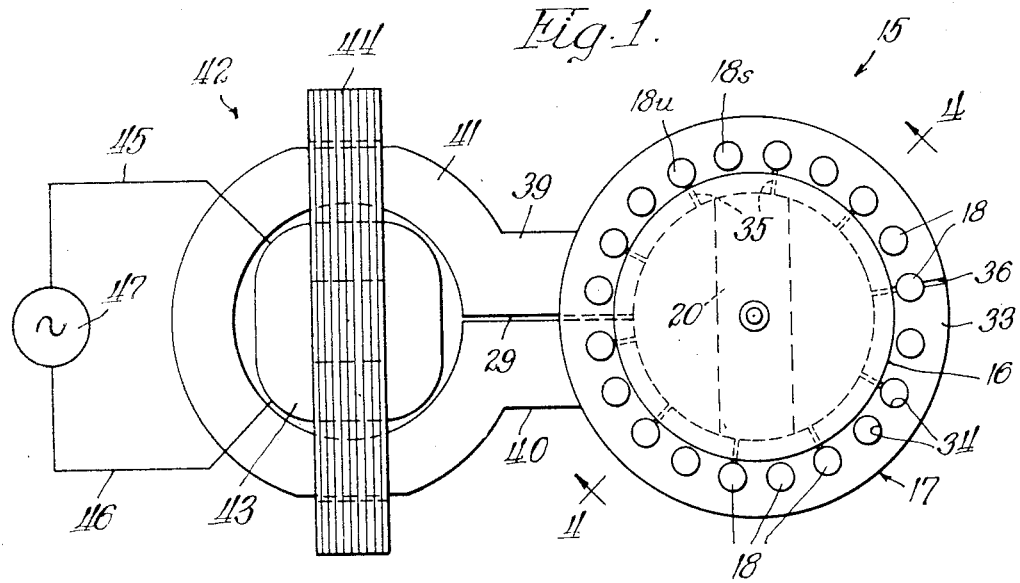
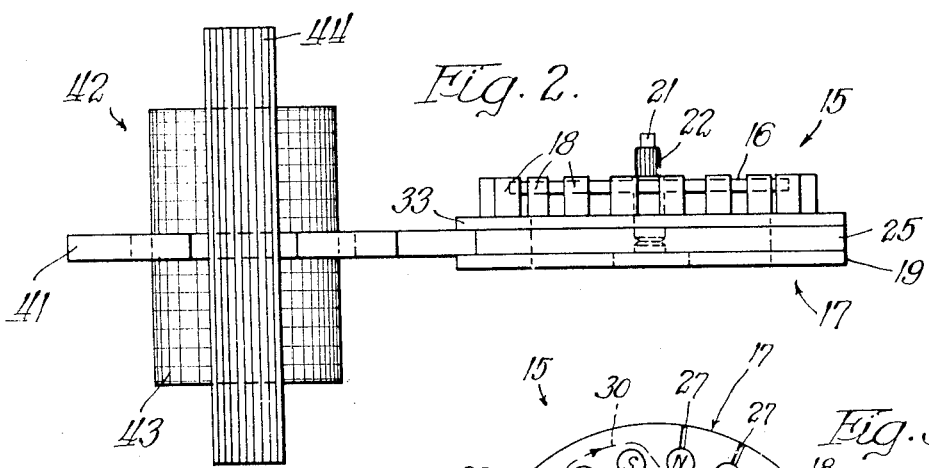
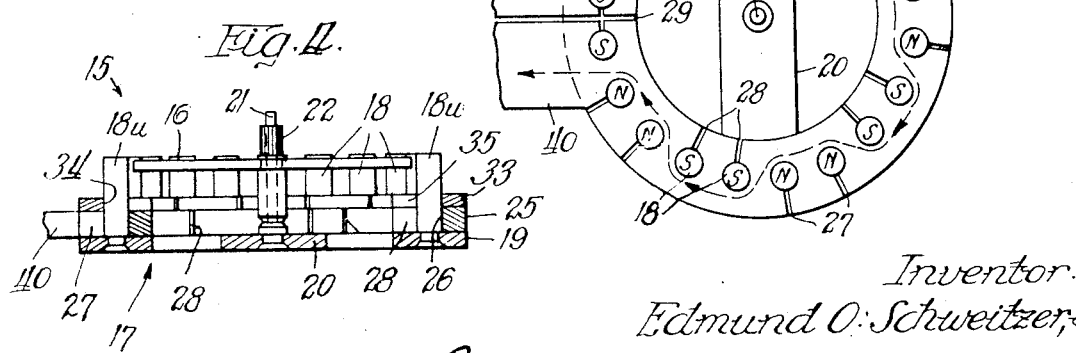
Inventor:
Edmund O. Schweitzer, Jr.
By Brown, Jackson, Boettcher, Dienner
Attys.

Oct. 29, 1940.　　E. O. SCHWEITZER, JR　　2,219,457
MOTOR CONSTRUCTION
Filed Dec. 17, 1938　　3 Sheets-Sheet 2
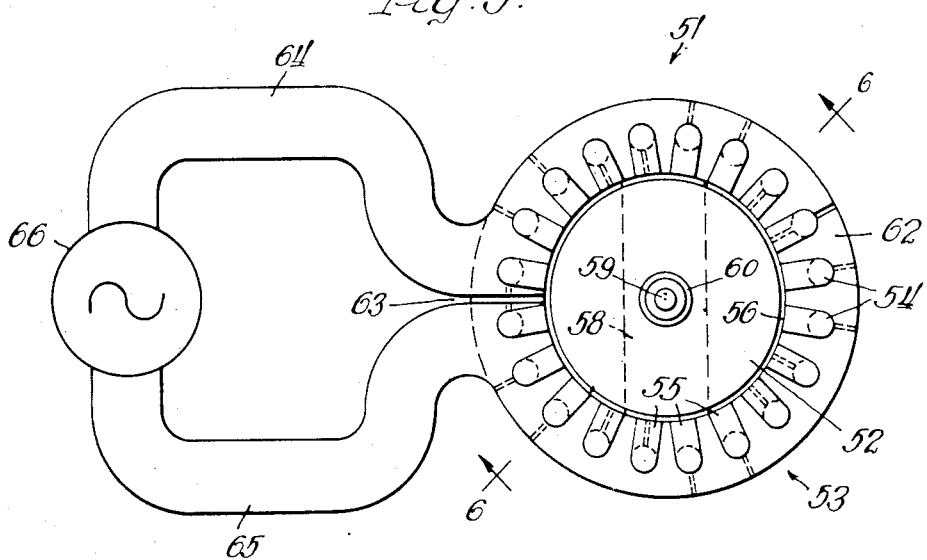
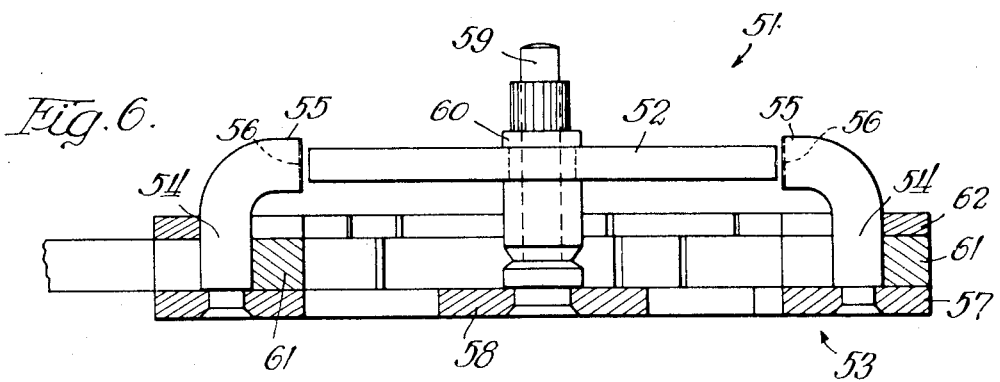
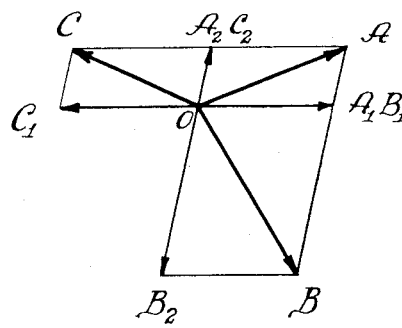
Inventor:
Edmund O. Schweitzer, Jr.
By Brown, Jackson, Boettcher & Dienner
Attys.

Oct. 29, 1940.  E. O. SCHWEITZER, JR  2,219,457
MOTOR CONSTRUCTION
Filed Dec. 17, 1938   3 Sheets-Sheet 3
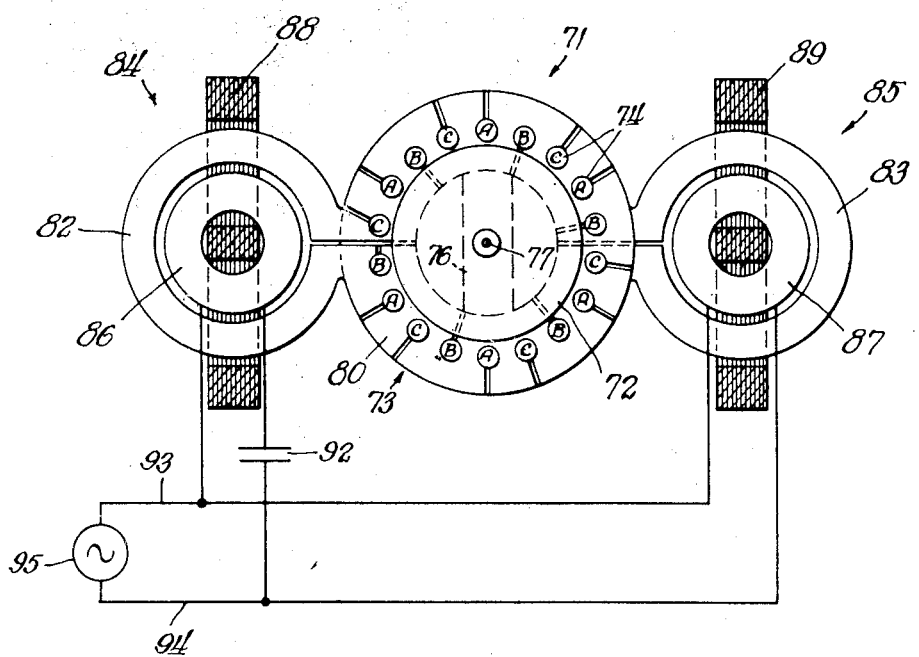
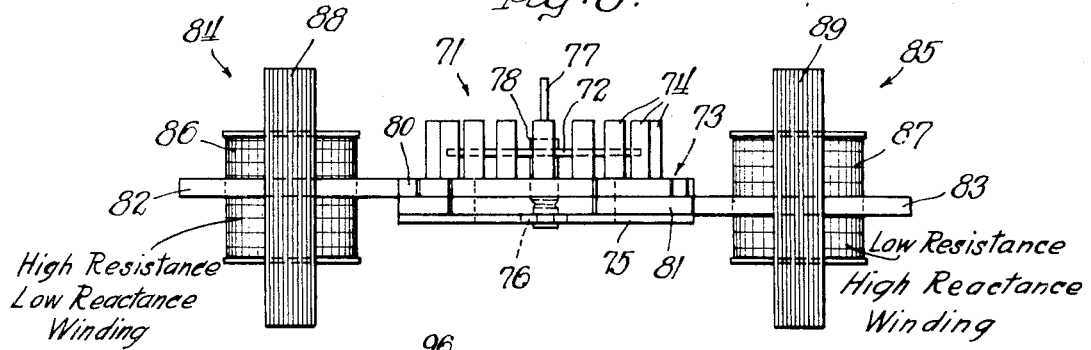
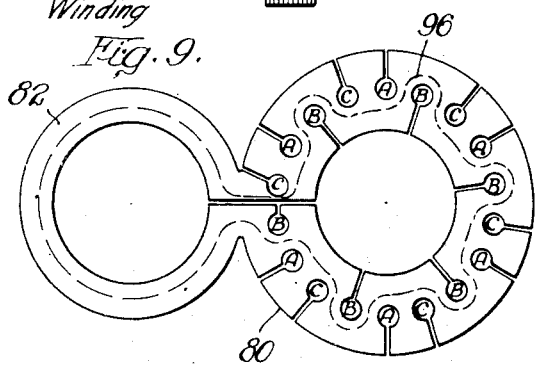
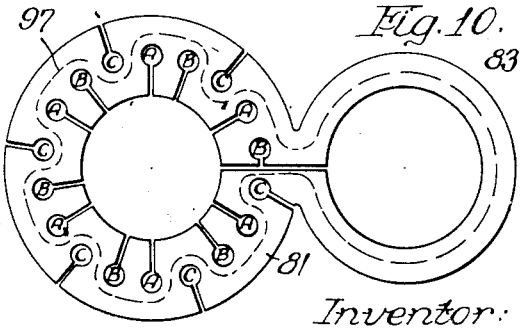
Inventor:
Edmund O. Schweitzer, Jr.

Patented Oct. 29, 1940

2,219,457

UNITED STATES PATENT OFFICE 2,219,457

MOTOR CONSTRUCTION

Edmund O. Schweitzer, Jr., Northbrook, Ill.

Application December 17, 1938, Serial No. 246,326

7 Claims. (Cl. 172—278)

My invention relates generally to electric motor construction, and it has particular relation to the construction of small slow speed self-starting synchronous motors.

In order to operate an alternating current electric motor at a low synchronous speed it is necessary to provide a large number of poles when a source of commercial frequency, such as a 60 cycle source, is employed. For example, when two poles are provided the motor operates at 3600 R. P. M. A four-pole motor operates at 1800 R. P. M., while a ten-pole motor operates at 720 R. P. M., and a twelve-pole motor operates at 600 R. P. M. Various arrangements of windings have been employed in the prior art in order to provide these poles. Of course, an individual winding can be used for each pole or each pair of poles. This construction, however, is suitable principally for the larger sizes of motors and is generally impractical for small motors such as are employed for driving clocks, time switches, talking machines and other devices where a definite fixed speed is required.

The so-called basket type of pole construction can be employed to provide a large number of poles. In general, this construction comprises a plurality of inter-linking spaced apart polar projections having a common magnetic return circuit around which is positioned an energizing winding. Since this winding is relatively remote from the tips of the polar projections adjacent which the rotor is located, there is of course considerable leakage of magnetic flux which never finds its way into the rotor where it could be employed for developing torque. Consequently, a motor of this type is relatively inefficient and has a relatively low power output. Because of the relatively small amount of energy required to operate motors of this type little attention has been paid to their efficiency.

There are other types of motor construction which may be employed for small low speed synchronous or sub-synchronous motors. However, they are generally relatively inefficient or they lack sufficient power to drive an appreciable load such as the load which is encountered in driving the turn table of a phonograph.

Accordingly, the objects of my invention, generally stated, is to provide a low speed high power self-starting alternating current motor which shall be simple and efficient in operation and which can be readily and economically manufactured and assembled.

An important object of my invention is to provide a large number of poles for an alternating current motor by employing a single winding so arranged that it creates the poles substantially at the place where the resulting flux is employed for developing torque.

Another important object of my invention is to substantially increase the power output of an alternating current motor having a large number of poles that are created by means of a single winding.

Still another important object of my invention is to generate flux at each pole of an alternating current motor having a large number of poles by means of a winding common to all of the poles.

Another object of my invention is to operate a motor at a relatively low synchronous speed by employing a single winding linking a large number of poles.

Still another object of my invention is to so arrange the single winding of an alternating current motor which energizes a large number of poles in such manner that it may be manufactured relatively simply, such as by a punch press operation.

A further object of my invention is to create a shifting magnetic field in an alternating current motor of the type described herein.

Still another object of my invention is to provide for self-starting a low speed synchronous motor of the type described herein.

A still further object of my invention is to electrically shift the magnetic field in a motor of the type described herein without requiring the use of shading coil means.

Still another object of my invention is to generate a shifting polyphase magnetic field in a motor of the type described herein through the use of time and space phase displaced alternating currents.

A further object of my invention is to generate a synchronous polyphase magnetic field in a motor of the type described herein by the interaction of a pair of windings each differently linking the polar projections of the motor and energized by time phase displaced alternating currents.

Other objects of my invention will in part be obvious and in part appear hereinafter.

According to my invention I provide an alternating current motor having a large number of polar projections each of which is individually energized by a single turn of a common winding in such manner as to create alternate poles of opposite polarity. The polar projections are formed, of course, of magnetic material and are uniformly spaced about a rotor. The polar projections are linked by a single turn of a wave winding which is energized from a suitable source of single phase alternating current. Since only a single turn is employed, the voltage applied thereto is relatively low and the current flow therein is relatively high. To obtain this voltage and current relationship the single turn of the winding is preferably arranged to constitute an extension of a secondary winding of a transformer, the primary winding of which is connected to a suitable source of alternating current such as a 110 volt, 60 cycle source. A disc type of rotor when brought up to the synchronous speed determined by the number of poles and the frequency will continue to rotate at this speed.

In order to provide a motor having self-starting characteristics, the polar projections may be formed in pairs having the wave winding linking the pairs of polar projections so that there will be alternate pairs of poles of opposite polarity. The corresponding pole of each pair of poles is shaded so that a shifting magnetic field is created which is effective to bring the rotor from standstill up to synchronous speed.

According to another embodiment of the invention two wave windings are provided and are arranged to interlink different combinations of the polar projections. The two windings are connected for energization to time phase displaced sources of alternating current with the result that a rotating magnetic field is created by the interaction of the time and space phase displaced fluxes that are generated as a result of the interaction of these two windings.

In order to facilitate manufacture of the motors of the type described herein the stator windings are so constructed that they may be formed by a simple stamping or punch press operation. This is possible because only a single turn winding is employed.

For a more complete understanding of the nature and scope of my invention reference may be had to the following detail description taken in connection with the accompanying drawings, in which—

Figure 1 is a view in side elevation of one embodiment of a motor constructed in accordance with the present invention;

Figure 2 is a bottom plan view of the motor shown in Figure 1;

Figure 3 is a plan view of the stator of the motor shown in Figure 1;

Figure 4 is a detail sectional view taken along the line 4—4 of Figure 1;

Figure 5 is a view in side elevation of another embodiment of the motor constructed along the lines of the motor shown in Figure 1;

Figure 6 is a detail sectional view at an enlarged scale taken along the line 6—6 of Figure 5;

Figure 7 is a view in side elevation of a polyphase motor constructed in accordance with the present invention together with the circuit connections, the core structure of the transformers being shown in section in order to more clearly illustrate the invention;

Figure 8 is a bottom plan view of the motor shown in Figure 7;

Figures 9 and 10 are views in side elevation of the windings forming a part of the stator of the polyphase motor shown in Figure 7; and Figure 11 is a vector diagram of the flux relationships which exist in the polyphase motor shown in Figure 7.

Referring now particularly to Figures 1 and 2 of the drawings, it will be observed that the reference character 15 designates generally a motor having a rotor 16 which may be formed of a disc of magnetic material. The disc 16 is surrounded by a stator, shown generally at 17, which includes a plurality of polar projections 18 in the form of pins of magnetic material that are suitably secured, as by riveting, to a ring 19 of magnetic material. A cross member 20 may be secured to the ring 19 for supporting a shaft 21 on which a hub 22 of the rotor 16 is mounted for rotation.

With a view to energizing the polar projections 18 a single turn wave winding 25 is provided as a part of the stator 17. As shown more clearly in Figure 3 of the drawings, the winding 25, which is preferably formed of copper, is provided with uniformly spaced apertures 26 for interfitting with the polar projections 18 and through which they project as illustrated more clearly in Figures 2 and 4 of the drawings. Since it is desired to have the winding 25 link pairs of polar projections 18, radial slots 27 are provided extending outwardly from every other pair of apertures 26 while similar slots 28 extend radially inwardly from the other alternate pairs of apertures 26. An additional slot 29 is provided to separate the ends of the winding 25 so that the current flowing therethrough follows the sinuous path indicated by the broken line 30 at some instant in a cycle of alternating current. With the current flow as indicated by the broken line 30, the polar projections 18 will have the polarities as indicated thereon. For each pair of north poles there is a corresponding adjacent pair of south poles. Since there are ten pairs of poles the synchronous speed of the motor and the speed at which the rotor 16 operates is 720 R. P. M.

It is of course desirable to have the motor 15 capable of self-starting so that it is unnecessary to provide external means for bringing the rotor 16 up to synchronous speed. For this purpose a shading ring 33 is provided having apertures 34 therein which are so spaced as to permit the polar projections 18 to project therethrough, as is more clearly shown in Figures 2 and 4 of the drawings. Since it is desirable to shade only one polar projection of each pair, every other aperture 34 is provided with a slot 35, which, as shown in Figure 1, may extend radially inwardly. In this manner one polar projection of each pair of poles is unshaded while the other polar projection is shaded. For example, the polar projection 18$^u$ with which one of the slots 35 is associated is unshaded, while the other polar projection 18$^s$ of this pair of polar projections is shaded since it is entirely surrounded by a portion of the shading ring 33. The shading ring 33 is preferably formed of copper.

In order to reduce the flow of circulating currents in the shading ring 33, one of the slots 35 may be extended through to the outer periphery as indicated at 36, thereby providing an incomplete circuit around the shading ring 33.

In the construction of the motor 15 it will be noted that the winding 25 links each pair of polar projections 18. Each pair of poles is substantially equally well supplied with magnetic flux since the same current flows past each pair of poles and therefore each pair of poles has the same number of ampere turns applied to it. This is in contra-distinction to the so-called basket construction in which the ampere turns of the energizing winding are, in effect, divided among all of the poles rather than having all of them available for each pole or pair of poles as the case may be.

The winding 25 may be energized from a suitable source of alternating current. Since this winding is a single turn winding it is necessary that a relatively large current flow through it in order to create the necessary magnetic field for operating the rotor 16. Because of the large section of copper forming the winding 25 a relatively low voltage is required to cause this heavy current to flow. These requirements naturally lend themselves to the use of a transformer for energizing the winding 25, although it will be understood that the winding 25 may be directly connected to a source of alternating current.

As a practical expedient, the ends of the winding 25 are connected by conductors 39 and 40 to a single turn secondary winding 41 of a transformer shown generally at 42, having a primary winding 43 and a magnetic core 44 which links both the primary and secondary windings, as illustrated. The primary winding 43 may be connected by conductors 45 and 46 to a source 47 of alternating current, such as a 60 cycle 110 volt source.

It will be observed that the winding 25 forming a part of the stator 17 really constitutes an extension of the secondary winding 41 of the transformer 42. Obviously, the windings 25 and 41 interconnected by the conductors 39 and 40 may be formed from a single piece of conducting material such as copper. The arrangement of these windings is such that they may be stamped or punched out of plate copper by a single operation, or, if necessary, repeated operations, to form them into the shapes shown with the apertures and slots therein as illustrated.

While the secondary winding 41 of the transformer 42 is shown as being in the same plane as the winding 25 of the stator 17, it will be obvious that they may be positioned at right angles to each other or in parallel planes if it is desired to provide a more compact construction. For illustrative purposes, however, the construction and novel features are more clearly illustrated by showing the windings 25 and 41 in the same plane.

Referring now particularly to Figures 5 and 6 of the drawings, it will be observed that another embodiment of the invention is illustrated. The motor shown generally at 51 is somewhat similar in construction to the motor illustrated in Figures 1, 2, 3 and 4 and described hereinbefore. It comprises a disc type of rotor 52 that is surrounded by a stator, shown generally at 53.

As shown more clearly in Figure 6 of the drawings, the stator 53 is provided with a plurality of polar projections 54 in the form of pins of magnetic material the outer ends 55 of which are curved or turned radially inwardly toward the rotor 52. The surfaces 56 of the polar projections 54 adjacent the periphery of the rotor 52 are curved to conform to the curvature of the rotor so that the length of the air gap will be at a minimum, with the result that the leakage flux is materially reduced. Another advantage of the inwardly turned ends 55 is to obviate end thrust of the rotor 52 since, in this arrangement, it centers itself in alignment therewith. By notching the polar projections 18, Figure 2, the same result can be obtained. The pins forming the polar projections 54 are suitably secured, as by riveting, to a ring 57 of magnetic material. A support member 58 may be secured to the ring 57 for carrying thereon a shaft or pin 59 on which a hub 60 carrying the rotor 52 rotates.

In order to energize the polar projections 54 a single turn wave winding 61 is provided having apertures and slots therein arranged as shown in Figure 3 of the drawings for a similar winding 25. The shifting magnetic field is created by means of a shading ring 62 that is essentially the same as the shading ring 33 illustrated in Figure 1 of the drawings. In Figure 5 the radial slots in the shading ring 62 are not shown because the slots in the wave winding 61 are shown by broken lines and might be confused with the slots in the shading ring 62.

Any suitable source of alternating current may be employed for energizing the wave winding 61. As shown in Figure 5, the ends of the winding 61 are spaced as indicated at 63 and conductors 64 and 65 extend therefrom for connection to a suitable source 66 of alternating current, such as a 60 cycle source.

By turning the ends 55 of the polar projections 54 inwardly as shown in Figures 5 and 6 of the drawings and forming the faces 56 so curved as to conform to the curvature of the periphery of the rotor 52, the efficiency of the motor 51 is somewhat increased over that of the motor 15 because of the decrease of leakage flux in the former. Moreover, as indicated, this arrangement of the outer ends 55 of the polar projections 54 tends to center the rotor 52 at a predetermined position along the shaft 59 thereby making it unnecessary to provide a thrust bearing.

The space factor for the windings 25 and 61 is considerably less than the space factor for ordinary windings employing a number of turns of insulated wire. In the first place no insulation between turns is required since only a single turn is employed. In the second place, since a single turn of solid cross section is used there is of course no waste space as occurs between the turns of a winding made up of a number of turns of insulated wire.

Referring now particularly to Figures 7 and 8 of the drawings, it will be observed that the reference character 71 designates generally a motor constituting still another embodiment of my invention. The motor 71 is in effect a polyphase motor in which a rotating magnetic field is created by means of time and space phase displaced magnetic fields generated by separate windings. The motor 71 comprises a disc type of rotor 72 that is surrounded by a stator, shown generally at 73.

The stator 73 comprises a plurality of polar projections 74 in the form of pins of magnetic material that are secured to and carried by a ring 75 likewise formed of magnetic material. A suitable support member 76 is carried by the ring 75 and it in turn carries a shaft or pin 77 on which a hub 78 of the rotor 72 rotates.

With a view to energizing the polar projections 74 two single turn wave windings 80 and 81 are provided and are insulated from each other by any suitable means such as by coating them with insulating material such as varnish, shellac, etc. Since the voltage is very low, the normal oxide coating may be sufficient. As shown more clearly in Figures 9 and 10 of the drawings, the wave windings 80 and 81 form continuations of secondary windings 82 and 83, respectively, which in turn form parts of transformers 84 and 85, respectively. Primary windings 86 and 87 are provided for the transformers 84 and 85. The primary and secondary windings of the transformers are linked as illustrated by cores 88 and 89 of laminated magnetic material.

Since it is desirable to energize one of the primary windings 86 or 87 with alternating current that is displaced in time phase from that with which the other primary winding is energized, as shown in Figure 7, the primary winding 86 is connected through a capacitor 92 and across conductors 93 and 94 which are energized from a suitable source 95 of alternating current. The primary winding 87 is connected directly to the conductors 93 and 94 so that the current in it lags behind the current in the primary winding 86 by approximately ninety degrees.

Referring to the wave windings 80 and 81 shown in Figures 9 and 10, it will be observed that the radial slots are arranged differently in each of them so that each winding interlinks the polar projections 74 in different manners. This arrangement is desired in order to obtain a space phase relation between the fluxes generated by the wave windings 80 and 81.

For descriptive purposes the letters A, B and C in Figure 7 are applied to the polar projections 74. The same identifying characters are applied to the apertures in Figures 9 and 10 which correspond to these polar projections.

It will be observed that the arrangement of the radial slots in the wave winding 80 of Figure 9 is such that the current flows along the path indicated by the broken line 96. This current path then passes around the A and C poles of the group of poles A, B and C in one direction and around the B pole of this group in the opposite direction. As a result, at a given instant the poles A and C may be north poles while the pole B is a south pole.

Now, referring to Figure 10, it will be observed that the radial slots are provided in the wave winding 81 in such manner that the current from the secondary winding 83 flows along the path indicated by the broken line 97. Considering any group of poles A, B and C, this current path passes around the poles A and B together in one direction and around the pole C in the opposite direction. Thus at a given instant the poles A and B may be north poles while the pole C is a south pole.

Because of the provision of the capacitor 92 the current flowing in the wave winding 80 leads the current flowing in the winding 81. Because the current flowing through the wave winding 80 links the polar projections in a different manner than does the current flowing through the wave winding 81, the magnetic fields resulting around the stator 73 are displaced in time and space so that in effect a rotating field is provided.

As shown in Figure 11, this relationship of the magnetic fields may be represented vectorally. Considering first the magnetic field which is generated by the current flowing along the path 97 in the winding 81 of Figure 10, the magnetic flux created at the poles A and B may be represented by the vectors $OA_1$ and $OB_1$ which are superimposed one on the other. The flux generated at the C pole may be represented by the vector $C_1$. These vectors are oppositely related as shown since the current flowing along the path 97 generates a magnetic field in the poles A and B in one direction while it generates a magnetic field in the pole C in the opposite direction.

Referring now to the current flowing along the path 96 in the wave winding 80 of Figure 9, it will be recalled that this current leads the current flowing along the path 97 in the wave winding 81. In the winding 80 the current along the path 96 interlinks the poles A and C so that the magnetic flux thereat may be represented by the vectors $OA_2$ and $OC_2$ which are superimposed one upon the other. The flux generated at the pole B may be represented by the vector $OB_2$.

The vectors $OA_2$ and $OC_2$ are illustrated as being somewhat shorter than the vectors $OA_1$ and $OB_1$, although it may be assumed that the same value of current flows along each of the paths 96 and 97. This difference is due to the fact that the slots in the winding 80 which are associated with the poles A and C extend radially outwardly while the slots in the winding 81 associated with the A and B poles extend radially inwardly. The current flow around the poles A and C in the winding 80 is less effective in producing magnetic flux in these poles than is a like current in producing magnetic flux at the poles A and B in the winding 81. In like manner the vector $OC_1$ representing the flux generated at the pole C by the winding 81 is somewhat shorter than the vector $OB_2$ representing the flux which is generated at pole B by the winding 80.

In further explanation of the difference between the fluxes generated at the A and B poles in Figure 9, as represented by the vectors $OA_2$ and $OB_2$ in Figure 11, it is pointed out that the B poles are surrounded by the single turn winding 80 while the A poles are outside of this winding. At a given instant when the current flow in winding 80 is in a clockwise direction the upper ends of the B poles will form south poles. At the same instant the corresponding ends of the A poles will form north poles. However, because of the proximity of the relatively large amount of flux within the single turn winding 80 to the A poles, there is a differential or demagnetizing effect which results in the A poles, in the particular case in question, being somewhat weaker than the B poles.

As shown in Figure 11, the vectors may be combined to produce the vectors OA, OB and OC which, while not symmetrically arranged, they produce the effect of a rotating magnetic field that is somewhat the same as is generated by a distributed winding of a three phase alternating current motor. The well known advantages of a three phase motor construction are then obtained by properly combining the two windings 80 and 81 with different pole combinations. A relatively large starting torque is provided since the resultant fluxes are fairly widely spaced apart. Since shading coils or rings are not employed to obtain the time and space displaced fluxes, the efficiency of the polyphase construction is considerably improved. Then too, it is possible to materially exceed the usual 20° to 30° phase shift to which the shading construction is of course limited. Therefore a more uniform torque can be developed.

Although eighteen polar projections 74 are illustrated in the motor construction shown in Figures 7 and 8, they are so related as to produce in effect six pairs of poles or twelve poles, whereby the rotor 72 is operated at a speed of 600 R. P. M. when the source 95 is a 60 cycle source. It will be noted that only three polar projections 74 are required to obtain a north and south pole combination in the motor 71 while four polar projections 18 or 54 in Figures 2 and 6, respectively, are required. This is due to the fact that in the one construction the polar projections 74 are linked by windings energized by time phase displaced currents while in the other construction only a single winding is directly energized and reliance is placed on the shading rings to lag the flux and provide a time and space phase relationship between parts of the fluxes.

It will be obvious that the arrangement of the transformers 84 and 85 may be different from that shown. For illustrative purposes, however, these transformers have been shown in such relation to the motor 71 that the secondary windings 82 and 83 lie in the planes of the windings 80 and 81. Obviously, the secondary windings 82 and 83 can be turned at right angles to the positions shown in the drawings so that the cores 88 and 89 will be in the same or parallel planes. When such a construction is employed the amount of magnetic material for the cores can be reduced by combining certain parts of the magnetic circuit for both of the sets of primary and secondary windings.

Instead of employing the capacitor 92 for shifting the time phase relation of the currents in the windings 80 and 81, the construction of the primary windings 86 and 87 and their associated cores 88 and 89 may be such as to provide the desired relationship. For example, as indicated in Figure 8 of the drawings one of the primary windings may have a relatively small number of turns and the associated magnetic circuit may be relatively good while the other primary winding may have a relatively large number of turns and the associated magnetic circuit may be relatively poor, both primary windings, however, having the same number of ampere turns. Combinations of these relationships may be employed with the capacitor 92, if desired.

Since certain further constructions can be made without departing from the spirit and scope of my invention, it is intended that all matter shown in the accompanying drawings or described hereinbefore shall be interpreted as illustrative and not in a limiting sense.

I claim as my invention:

1. An electric motor comprising, in combination, a rotor; a stator cooperating with said rotor and including a plurality of pairs of polar projections disposed in uniform spaced relation, a transformer including a single turn secondary winding, a single turn winding constituting an integral extension of said secondary winding embracing said pairs of polar projections in a sinuous manner to create alternate pairs of poles of opposite polarity, and shading means cooperating with the corresponding polar projection of each pair of polar projections for creating a shifting magnetic field whereby the motor is self-starting; a primary winding for said transformer adapted to be connected to a single phase source of alternating current, and a magnetic circuit linking said primary and secondary windings.

2. An electric motor comprising, in combination, a rotor; a stator cooperating with said rotor and including a plurality of pairs of polar projections disposed in uniform spaced relation, a platelike single turn winding having spaced apertures therein for interfitting with said polar projections, adjacent pairs of apertures opening radially outwardly and inwardly to create alternate pairs of poles of opposite polarity, and a platelike shading ring having spaced apertures therein for interfitting with said polar projections and arranged and adapted to cooperate with the corresponding polar projection of each pair of polar projections for creating a shifting magnetic field whereby the motor is self-starting; and circuit means for connecting said winding means to a shingle phase source of alternating current.

3. An electric motor comprising, in combination, a rotor; a stator cooperating with said rotor and including a plurality of polar projections disposed in spaced relation, and a pair of single turn windings each embracing different combinations of said polar projections in a sinuous manner; and means for energizing said windings with alternating current.

4. An electric motor comprising, in combination, a rotor; a stator cooperating with said rotor and including a plurality of polar projections disposed in spaced relation, a pair of transformers each including a single turn secondary winding, and a pair of windings each embracing different combinations of said polar projections in a sinuous manner, each of said windings constituting an integral extension of one of said secondary windings; a primary winding inductively related to each secondary winding, and means for energizing said primary windings with alternating current.

5. An electric motor comprising, in combination, a rotor; a stator cooperating with said rotor and including a plurality of polar projections disposed in spaced relation, and a pair of single turn windings each embracing different combinations of said polar projections in a sinuous manner; and means for energizing said windings with time phase displaced alternating currents whereby a shifting magnetic field is generated and the motor is self-starting.

6. In a dynamo-electric means, in combination, a plurality of pole members in groups of three comprising A, B and C pole members, a first single turn winding embracing in a sinuous manner the A and C pole members in one direction and the B pole member in the opposite direction, and a second single turn winding embracing in a sinuous manner the A and B pole members in one direction and the C pole member in the opposite direction.

7. In a dynamo-electric means, in combination, a plurality of pole members, and a pair of single turn windings disposed to be energized with time phase displaced alternating currents, said windings embracing said pole members in a sinuous manner to generate a three phase shifting magnetic field.

EDMUND O. SCHWEITZER, Jr.